(12) United States Patent
Huo et al.

(10) Patent No.: US 11,704,175 B2
(45) Date of Patent: Jul. 18, 2023

(54) BRIDGING VIRTUAL DESKTOPS UNDER NESTED MODE

(71) Applicant: VMware, Inc., Palo Alto, CA (US)

(72) Inventors: Huiyong Huo, Beijing (CN); Zhongzheng Tu, Beijing (CN); Mingsheng Zang, Beijing (CN); Weigang Huang, Beijing (CN); Jinxing Hu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/670,800

(22) Filed: Feb. 14, 2022

(65) Prior Publication Data
US 2023/0195548 A1 Jun. 22, 2023

(30) Foreign Application Priority Data
Dec. 17, 2021 (WO) ................. PCT/CN2021/139144

(51) Int. Cl.
G06F 9/44 (2018.01)
G06F 9/54 (2006.01)
G06F 9/451 (2018.01)
H04L 67/141 (2022.01)

(52) U.S. Cl.
CPC ............... *G06F 9/547* (2013.01); *G06F 9/452* (2018.02); *H04L 67/141* (2013.01)

(58) Field of Classification Search
CPC .................................................. G06F 9/547
USPC .......................................................... 719/319
See application file for complete search history.

(56) References Cited

U.S. PATENT DOCUMENTS

| | | | |
|---|---|---|---|
| 2014/0109115 A1* | 4/2014 | Low ........................ | G06F 9/54 719/328 |
| 2017/0228263 A1* | 8/2017 | Seitz ....................... | G06F 8/71 |
| 2017/0300316 A1* | 10/2017 | Lopyrev ................ | H04L 67/34 |
| 2019/0171440 A1* | 6/2019 | Lopyrev ............ | G06F 9/45504 |

* cited by examiner

*Primary Examiner* — Timothy A Mudrick

(57) ABSTRACT

A system is described for establishing a nested bridge to improve data exchange between a client device and a second virtual desktop that is accessed by the client device through a first virtual desktop in a nested mode configuration. The nested bridge can be established between a virtual desktop agent of the first virtual desktop and a virtual desktop client of the second virtual desktop, both of which can run in the first virtual desktop, to enable fast and efficient exchange of data between the agent and client within the first virtual desktop via a mechanism such as Inter-Process Communication (IPC). Consequently, the nested bridge can be utilized in conjunction with virtual channels connecting the client device to the first virtual desktop and virtual channels connecting the first virtual desktop to the second virtual desktop for exchanging data between the client device and the second virtual desktop via the first virtual desktop. As a result, a fast and efficient path for exchanging data between a client on the client device and the second virtual desktop is provided, which can be utilized for enabling and improving the performance of various features in the second virtual desktop.

20 Claims, 10 Drawing Sheets

BRIDGING VIRTUAL DESKTOPS UNDER NESTED MODE

CLAIM OF PRIORITY

This application is based upon and claims the benefit of priority from International Patent Application No. PCT/CN2021/139144, filed on Dec. 17, 2021, which is incorporated by reference herein in its entirety.

TECHNICAL FIELD

The present disclosure generally relates to virtual desktops and more specifically to techniques for efficiently accessing a second virtual desktop from within a first virtual desktop.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

To utilize what is referred to as "nested" mode, a user who is accessing a first virtual desktop running on a server can access a second virtual desktop, which may be running on yet another server, from the first virtual desktop. The user can do this by launching a virtual desktop client in the first virtual desktop and using it to launch and connect to the second virtual desktop from within the first virtual desktop.

However, running virtual desktops in nested mode poses numerous challenges. For example, to enable various features in a virtual desktop, certain data needs to be exchanged between the local client device and the virtual desktop. Printing from the virtual desktop, copying/pasting to the virtual desktop, accessing USB devices in the virtual desktop, and using a camera or microphone in the virtual desktop are just some examples of the various features that can require data exchange between the local machine and the virtual desktop. To enable these features and others in a virtual desktop, the local user device needs to exchange corresponding data needed by the features with the virtual desktop. Typically, a protocol virtual channel is established between the client device and the virtual desktop and is utilized for transferring such data.

When using a virtual desktop in nested mode, the local client device likewise needs to exchange data required by features with the second virtual desktop to enable use of the features in the second desktop. However, because the second virtual desktop is accessed by the local client device via the first virtual desktop, the data required by such features cannot be exchanged between the user device and the second virtual desktop in the same way it is exchanged normally in non-nested virtual desktops, making use of such features in the second virtual desktop inefficient, if not impossible. What is needed is a more efficient way for enabling features in virtual desktops when utilizing nested mode.

DETAILED DESCRIPTION

Figure 1:
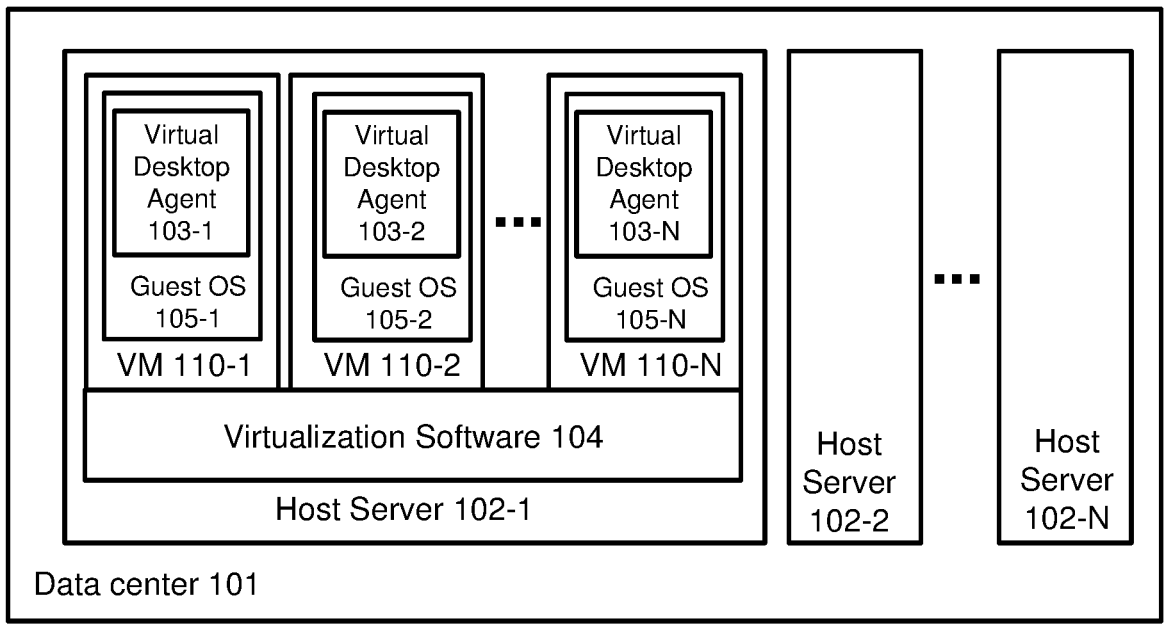
FIG. 1 illustrates an example of a virtual desktop environment, in accordance with various embodiments.
Figure 1:
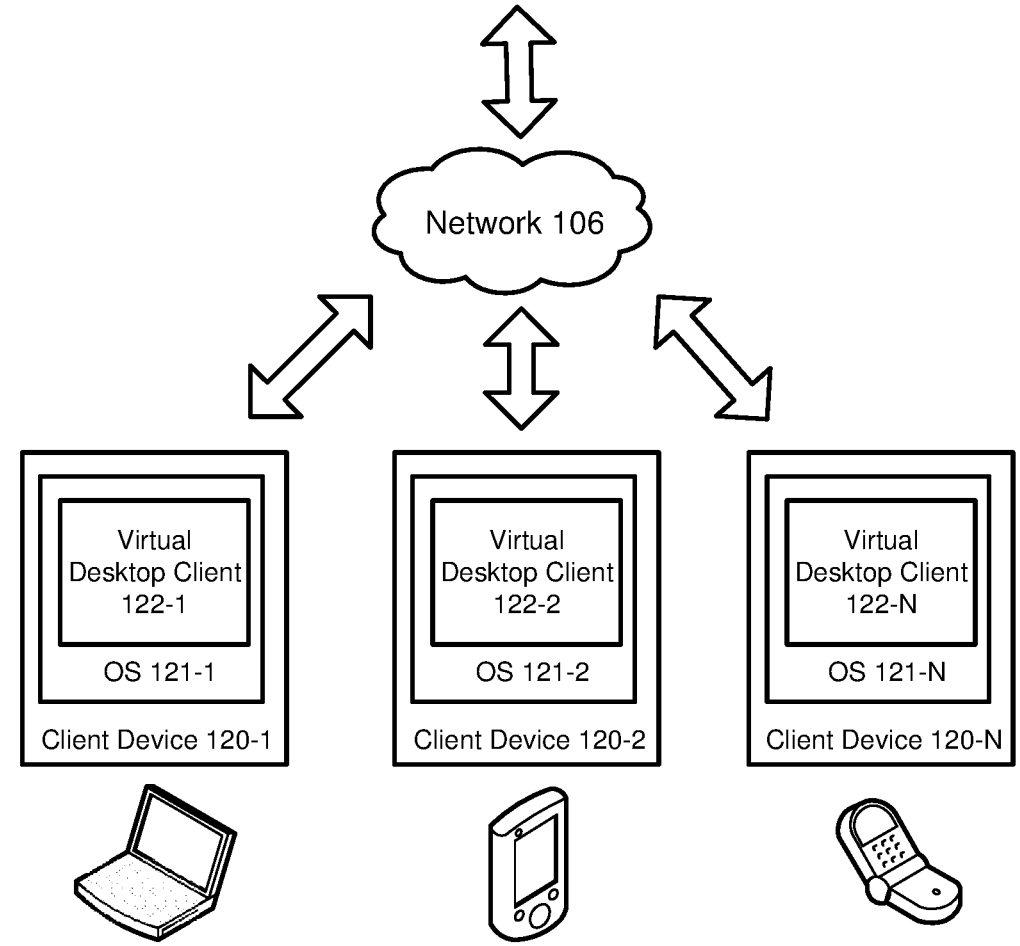

Systems and methods in accordance with various embodiments of the present disclosure overcome at least some of the above-mentioned shortcomings and deficiencies by providing more efficient ways to exchange data between a client device and a virtual desktop in nested mode. In particular, embodiments described herein leverage an Inter-Process Communication (IPC) mechanism to establish a nested bridge for transferring data between the agent of a first virtual desktop and the client connected to a second virtual desktop in nested mode to enable fast and efficient transfer of data required by features in the second virtual desktop.

The process can begin by establishing a first virtual desktop session between a first virtual desktop client operating on a client computing device and a first virtual desktop agent operating in a first virtual desktop on a host server. For example, this can be performed by a user launching a client on their user device and connecting to the first virtual desktop via the client. After the first virtual desktop session is established, a second virtual desktop session can be initiated between a second virtual desktop client operating in the first virtual desktop and a second virtual desktop agent operating in the second virtual desktop. For example, this can be performed by the user launching the second client in the second virtual desktop, and connecting to the second virtual desktop via the second client. This type of configuration, where a virtual desktop client running within a virtual desktop is used to connect to another virtual desktop is referred to herein as "nested mode" because the second virtual desktop session is effectively "nested" within the first virtual desktop session. Accessing the virtual desktop in nested mode involves two network hops, where during the first network hop data is communicated between the first virtual desktop client and the first virtual desktop agent and during the second network hop data is communicated between the second virtual desktop client and the second virtual desktop agent.

In each virtual desktop, data can be communicated between the client and the agent via one or more virtual channels. For example, when the first virtual desktop is established, one or more virtual channels can be formed between the client on the user device and the agent in the first virtual desktop on the host server, and data can be communicated between the client and the agent through the virtual channels. Likewise, when the second virtual desktop is established, virtual channels can be formed between the second client on the first virtual desktop and the second agent in the second virtual desktop, and data can be communicated between the second client and the second agent through the virtual channels.

In various embodiments, a nested bridge can be established between the first virtual desktop agent and the second virtual desktop client, both running in the first virtual desktop, for communicating data between the first virtual desktop agent and the second virtual desktop client. The nested bridge can utilize Inter-Process Communication (IPC) for fast and efficient transfer of data between the first virtual desktop agent and the second virtual desktop client. Consequently, the nested bridge can be utilized in conjunction with the virtual channels for exchanging data between the first client running on the client device and the second virtual desktop. For example, data can be conveyed from the first client on the client device to the first agent in the first virtual desktop over a virtual channel, passed from the first agent to the second client running in the first virtual desktop using the nested bridge, and then conveyed from the second client to the second agent in the second virtual desktop over a virtual channel. Data can likewise be communicated from the second virtual desktop agent to the first client over the virtual channels and the nested bridge in the opposite direction. As a result, a fast and efficient path for exchanging data between the first client on the client device and the second virtual desktop is provided, which can be utilized for enabling various features and capabilities in the second virtual desktop.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user can view the GUI of the remote desktop and interact with it as if the desktop was running on the local client device, even though the desktop is actually executing remotely.

In some cases, instead of providing a user with access to a full desktop session, i.e., where the user gets to see and interact with substantially the entire remote computing environment (e.g., the entire operating system, all applications, settings, etc., of the remote virtual machine), the user can be given access to a limited portion of the desktop or to a certain application or applications on the desktop, so that the user is able to see and interact with the limited portion or certain application(s) and not with other parts of the virtual desktop, which can be hidden from the user. This approach is preferable, for example, when an enterprise wishes to deliver access to a particular application to users, without giving access to the remainder of the computing environment where the application runs. This type of session may be referred to as a "virtual application", "remote application", or an "application session" throughout this disclosure and these terms may be used interchangeably. Hence, with a virtual application, the application can run inside a remote desktop but look and feel to the user on his or her client device as if only the application is executing. Behind the scenes, however, the application can be running inside a desktop session, but only the application's user interface (UI) may be visible and accessible to the user on the client device. As in a full desktop session, with virtual applications user inputs can be conveyed from the client device to the remote desktop and redirected to the operating system (OS) of the remote desktop, so that the OS can deliver the inputs to the application, while the GUI of the application is streamed back and displayed on the client device. It should be understood that the term "virtual desktop", as used herein, can apply to cases where access is provided to the substantially entire desktop as well as to cases where access is limited to certain portions of the remote computing environment, such as in the case of virtual applications.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
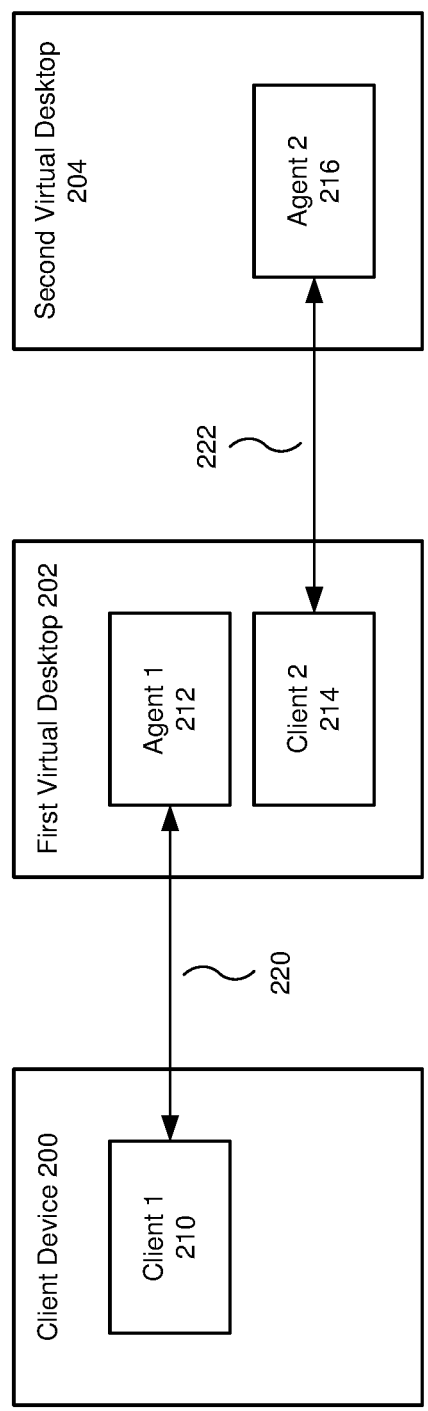
FIG. 2 illustrates an example of virtual desktop nested mode, in accordance with various embodiments.

FIG. 2 illustrates an example of virtual desktop nested mode, in accordance with various embodiments. As illustrated in the example of FIG. 2, client 1 210, which may be any kind of virtual desktop client, can operate on a client device 200. A user of the client device 200 can use client 1 210 to connect to virtual desktop agent 1 212, running in a first remote desktop 202, which can be a virtual desktop or a published desktop running on a remote server. Examples of virtual desktop client and remote desktop products are VMware Horizon desktop and application virtualization products available from VMware, Inc.

After the remote desktop session on the first virtual desktop 202 is established, a second virtual desktop client, client 2 214 can be launched inside the first virtual desktop 202. For example, the user can launch client 2 214 in the first virtual desktop 202. Client 2 214 can then connect to a second virtual desktop agent 216 running in a second virtual desktop 204 (which may be a virtual desktop or virtual application) from the first virtual desktop 202.

This way, client 1 210 can establish a first desktop session with the first virtual desktop 202 and client 2 214 can establish a second desktop session with the second virtual desktop 204. The user can then access the second virtual desktop 204 from the client device 200 by making inputs into client 2 214 running in the first virtual desktop 202, via client 1 210 running on the user's client device 200.

In various embodiments, data can be exchanged between the client 210 and agent 212 in the first desktop 202 via one or more virtual channels 220, which may be protocol virtual channels (e.g., remote desktop protocol (RDP) channels). Similarly, data can be exchanged between the client 214 and agent 216 in the second desktop 204 via one or more virtual channels 222, which may also be protocol virtual channels. The data exchanged over the channels 220, 222 can include user inputs (e.g., mouse and keyboard inputs), screen data (GUI pixel data), as well as data required to enable various features in the virtual desktop 202, 204 such as printing, USB access, copying/pasting, etc., as will be described further below.

In various embodiments, the virtual channels 220, 222 can be any logic communication channels between the client 210, 214 and the agent 212, 216. For example, in the VMware Horizon infrastructure, two kinds of virtual channel technology can be utilized. One is the PCoIP (PC over IP) virtual channel and the second one is the VMware virtual channel.

Take the PCoIP protocol as an example to illustrate the virtual channel in the Horizon infrastructure. A PCoIP virtual channel can serve as an extension or plugin of the PCoIP protocol. This can allow a Horizon client and a Horizon agent to define and implement their own logic protocol to exchange data. This way, PCoIP can be utilized as the transportation protocol. Further, multiple channels can be served via multiplex over the PCoIP data transfer channel.

In virtual desktops such as the virtual desktops 202, 204 of FIG. 2, the interactions between end-users and the remote agents (e.g., 212, 216) include not only the basic keyboard, mouse, and remote screen display functionality but also various features, referred to herein as "remote experience features", such as clipboard data sync, remote feature redirection (e.g., RTAV (Real-Time-Audio-Video) and MMR (Multimedia Redirection)), local peripherals redirection (e.g., USB devices, printers, etc.) and so forth. In various embodiments, such remote experience features can use the virtual channel to exchange necessary data between the client (e.g., 210, 2214) and the agent (e.g., 212, 216).

For example, if a user copies data on the client device 200 and wishes to paste it in the first virtual desktop 202 (e.g., in an application), then the copied data can be conveyed to the virtual desktop 202 over a virtual channel 220. Similarly, when data is copied from the virtual desktop 202 and pasted in the client device 200, the data can be conveyed over the virtual channel 220. In the same way, copy/paste data between the first virtual desktop 202 and the second virtual desktop 204 can be exchanged over the corresponding virtual channel 222.

Other remote experience features can likewise utilize virtual channels (e.g., 220, 222) for transferring data. For example, for multimedia redirection, such as MMR, TSMMR, HTML5 multimedia redirection, and so on, encoded multimedia data can be conveyed over the virtual channels (e.g., 220, 222) between the client (e.g., 210, 2214) and the agent (e.g., 212, 216). For RTAV, audio and video data can be conveyed over the virtual channels (e.g., 220, 222) to enable use of microphones and video cameras attached to the client in the virtual desktop. Data for other peripheral devices, such as USB devices, can likewise be conveyed over the virtual channels (e.g., 220, 222). Printer data can be conveyed over the virtual channels (e.g., 220, 222), e.g., to enable printing on the client from a virtual desktop.

Figure 3:
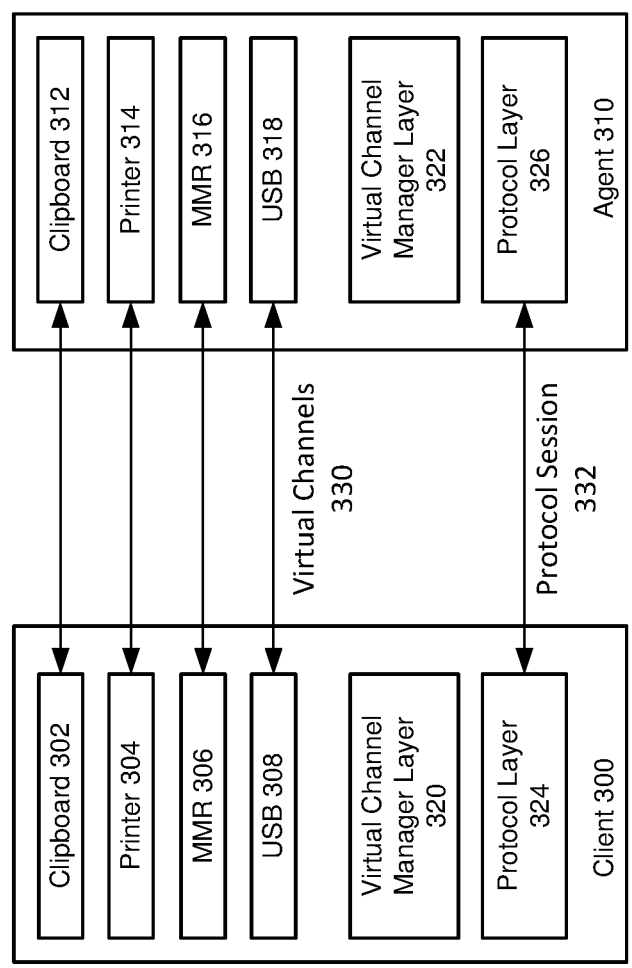
FIG. 3 illustrates an example of virtual channel connections between a virtual desktop client and agent, in accordance with various embodiments.

FIG. 3 illustrates an example of virtual channel connections between a virtual desktop client and agent, in accordance with various embodiments. As illustrated in the example of FIG. 3, a virtual desktop client 300 can be in communication with a virtual desktop agent 310 over a plurality of virtual channels 330. The client 300 can be either a client running on a client device (such as client 1 210 in the example of FIG. 2) or a client running in a virtual desktop that is connecting to another virtual desktop in nested mode (such as client 2 214 in the example of FIG. 2). The agent 310 can be either an agent running in a virtual desktop that is connected to a client device (such as agent 1 212 in the example of FIG. 2) or an agent running in a second virtual desktop that is connecting to a client running in a first virtual desktop during nested mode (such as agent 2 216 in the example of FIG. 2).

As illustrated, a protocol session 332 (e.g., RDP) can be established between a protocol layer 324 on the client 300 and a protocol layer 326 on the agent 310. A virtual channel manager layer 320 on the client 300 and a corresponding virtual channel manager layer 322 on the agent 310 can manage the exchange of information required by various features (e.g., remote experience features) over several virtual channels 330 between the client 300 and agent 310. For example, a clipboard feature module 302 on the client 300, which can be responsible for managing clipboard copy/paste operations in the client 300 can correspond with a corresponding clipboard feature module 312 on the agent, which can be responsible for managing clipboard copy/paste operations in the agent 310. The clipboard features 302, 312 can communicate over a virtual channel 330 to exchange requisite data and commands for carrying out copy and paste operations between the client 300 and agent.

Similarly, printer feature modules 304, 314 on the client 300 and agent 310, respectively, can correspond and exchange data over a virtual channel 330 to enable printing features (e.g., to allow the user to print a document from the remote desktop on the client device). MMR feature modules 306, 316 on the client 300 and agent 310, respectively, can correspond and exchange data over a virtual channel 330 to enable multimedia redirection between the client 300 and agent 310. USB feature modules 308, 318 on the client 300 and agent 310, respectively, can correspond and exchange data over a virtual channel 330 to enable USB device redirection between the client 300 and agent 310 (e.g., to allow the user to access from the remote desktop a USB device connected to the client device). While only these four remote experience features are illustrated in this example, various other features can also be supported and are not illustrated in the example of FIG. 2 for the sake of being concise.

Figure 4:
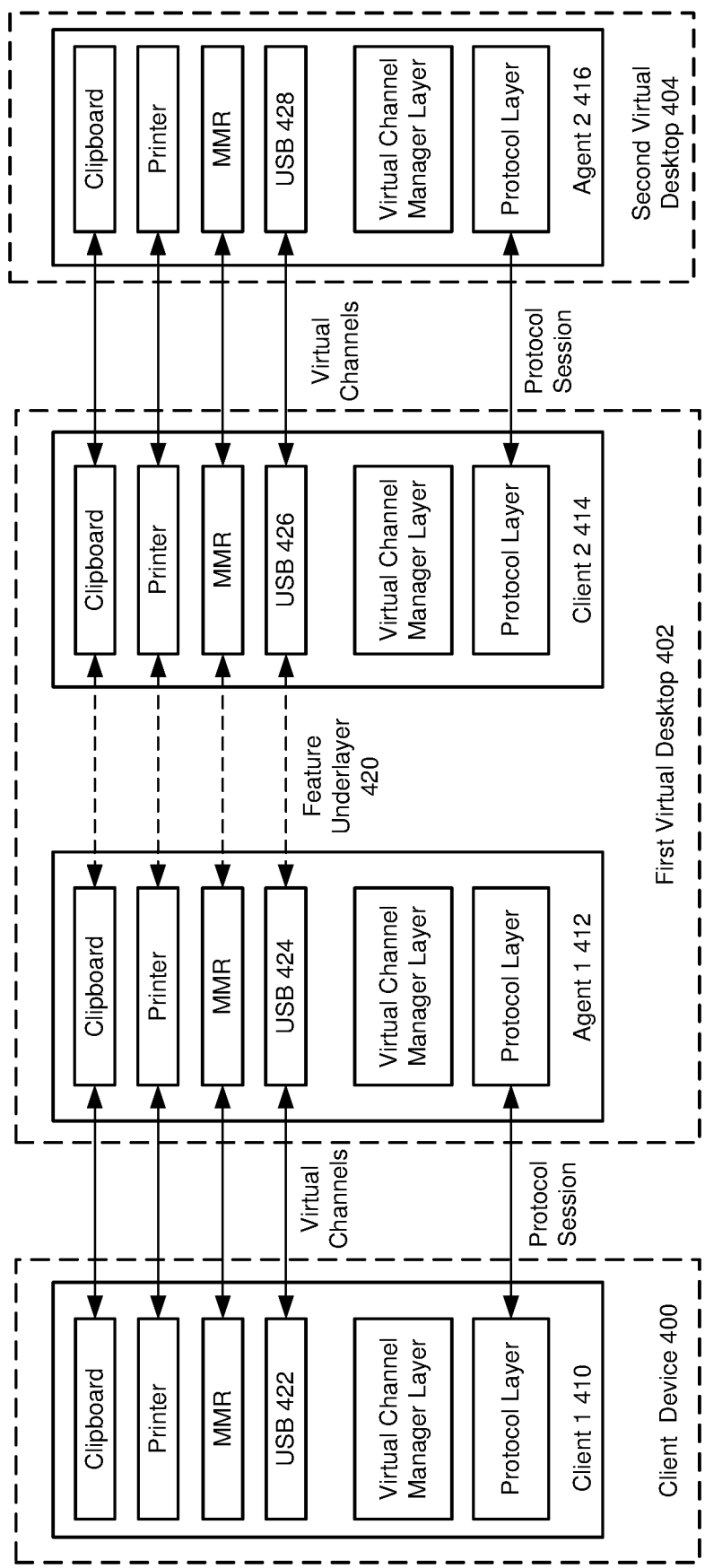
FIG. 4 illustrates an example of a feature underlayer used for data transfer in a virtual desktop environment in nested mode, in accordance with various embodiments.

FIG. 4 illustrates an example of a feature underlayer used for data transfer in a virtual desktop environment in nested mode, in accordance with various embodiments. As illustrated in the example of FIG. 4, in a nested mode configuration, client 1 410 on a client device 400 can connect to agent 1 412 on a first virtual desktop 402 in a first desktop session. Client 2 414 on the first virtual desktop 402 can connect to agent 2 416 on a second virtual desktop 404 in a second virtual desktop session. As described above in the example of FIG. 3, a protocol session can be established between each client 410, 414 and agent 412, 416, respectively, and various feature modules, such as remote experience features (e.g., clipboard, printer, MMR, and USB) on the clients 410, 414 can communicate with corresponding feature modules on the agents 412, 416 via virtual channels to enable the corresponding features in the virtual desktops 402, 404.

As shown in the example, agent 1 412 and client 2 414 can operate in the same virtual desktop 412. However, with past technology, even though agent 1 412 and client 2 414 may be running on the same device (e.g., a host server), they operated in isolation from each other. Namely, past technology did not provide a mechanism for direct communication between agent 1 412 and client 2 414. As a result, while data could be exchanged, for example, between client 1 410 and agent 1 412, and between client 2 414 and agent 2 416 over corresponding protocol virtual channels, an efficient mechanism was not provided for data exchange between agent 1 412 and client 2 414 on the first virtual desktop 402. Accordingly, exchange of data between client 1 410 and agent 2 416 was inefficient if not impossible, resulting in negative impacts on user experience with respect to various features that rely on exchange of data between these components. For example, using features in the second virtual desktop 404, such as the remote experience features, that required exchange of data between client 1 410 and agent 2 416 could be inefficient or impossible with past technology.

Taking USB device redirection, for example. To access a USB device that is attached to the client device 400 in the second virtual desktop 404 would require the corresponding USB device data to be exchanged between the client device 400 and the second virtual desktop 404. However, the standard protocol session provides for a virtual channel connection between client 1 410 in the client device 400 and agent 1 412 in the first virtual desktop 402, but not to agent 2 416 in the second virtual desktop 404, creating a challenge for implementing the feature in the second virtual desktop 404.

One approach to address this problem is to provide for data exchange between agent 1 412 and client 2 414 in the first virtual desktop at the driver level, producing a feature underlayer 420 that connects corresponding feature modules, as illustrated in the example of FIG. 4 by the dashed arrows. With this approach, in the case of USB redirection for example, data from a USB device that is connected to the client device 400 can first be transmitted over a virtual channel to agent 1 412 in the first desktop 402 (e.g., from USB module 422 in the client device 400 to USB module 424 in the first desktop 402). Then, in the first desktop 402, the USB data can be transmitted by a USB driver in the feature underlayer 420 from agent 1 412 to client 2 414 (e.g., from USB module 424 to USB module 426 in the first desktop 402). Last, the USB data can be transmitted over a virtual channel from client 2 414 in the first desktop 402 to agent 2 416 in the second desktop 404 (e.g., from USB module 426 in the first desktop 402 to USB module 428 in the second desktop 404). Data from the second desktop 404 can likewise travel in the reverse order to the USB device on the client device 400.

The feature underlayer 420 can likewise be used by other features including remote experience features (e.g., clipboard, printer, MMR, etc.) in the second desktop in a similar way. Namely, the virtual channels can be used to exchange data for the features between client 1 410 and agent 1 412 of the first virtual desktop 402, and between client 2 414 and agent 2 416 of the second virtual desktop 404, while the feature underlayer 420 can be used to exchange data between agent 1 412 and client 2 414 on the first virtual desktop 402 by pushing the data up to the driver layer and back from the protocol layer.

However, the approach utilizing the feature underlayer 420 has significant drawbacks. For example, to pass data at the driver level using the feature underlayer 420, the data is first received at the protocol layer of agent 2 414 (e.g., the data can be received from client 1 410 over a virtual channel) and is then be passed through multiple layers of agent 2 414 before reaching the lowest system driver. Then, the data can be transferred from the lowest system driver to client 2 414 and passed to the upper layer through multiple layers before reaching the protocol layer of client 2 414, from where the data can be passed over the virtual channel to agent 2 416. A reverse path can likewise be used for flow of data in the opposite direction. However, passing the data up and down through the multiple layers can incur significant performance penalties.

Figure 5:
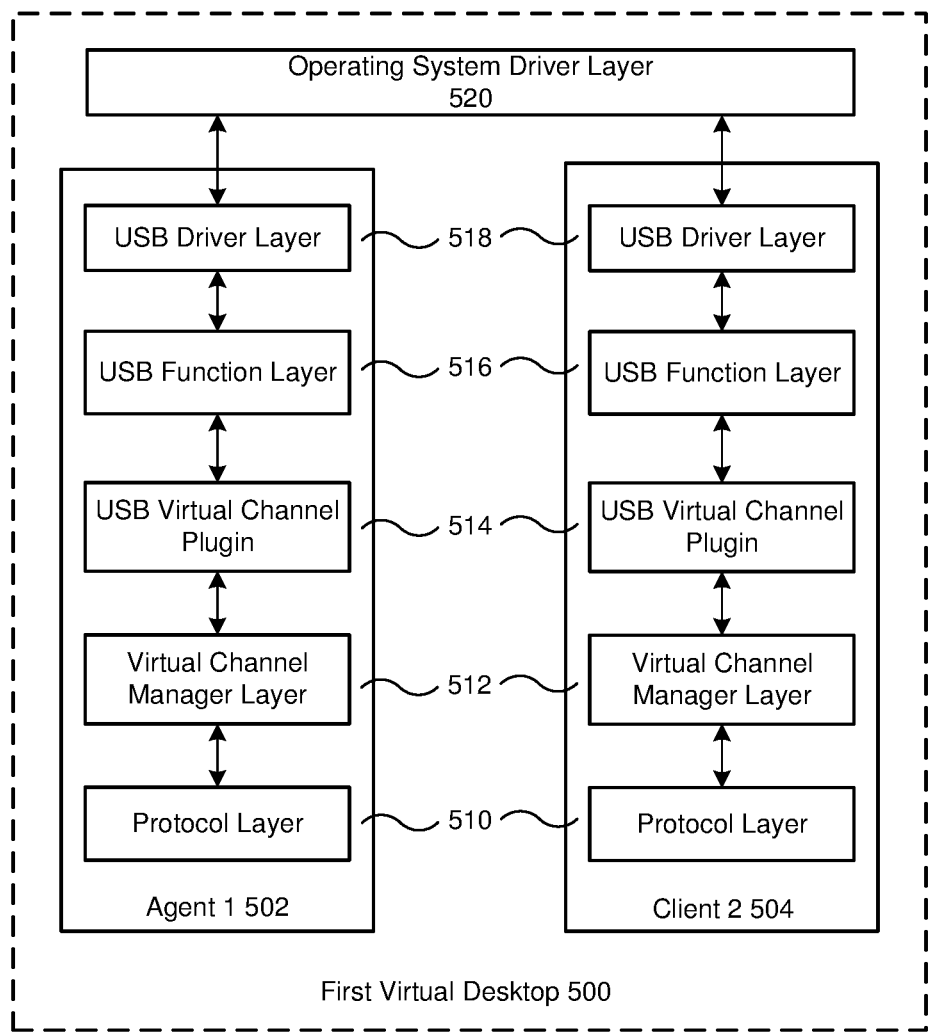
FIG. 5 illustrates an example of data exchange via a feature underlayer in USB redirection under nested mode, in accordance with various embodiments.

FIG. 5 illustrates an example of data exchange via a feature underlayer in USB redirection under nested mode, in accordance with various embodiments. As illustrated in the example of FIG. 5, agent 1 502 and client 2 504 can operate in a first virtual desktop 500. The first desktop 500 can be a first virtual desktop in a nested mode configuration, such as in the example of FIG. 4, where another client running on a client device is connected with agent 1 502 to establish a session on the first desktop 500, and client 2 504 is connected to another agent running in a second virtual desktop to establish a second virtual desktop session on the second desktop.

To perform USB redirection using the illustrated feature underlayer when a user is using the nested mode, for example, USB data can first be received at the protocol layer 510 of agent 1 502. For example, the data can be conveyed from a client running on the user client device via a virtual channel. In agent 1 502, the data can then be passed to the virtual channel manager layer 512, which can be responsible for receiving, sending, and managing data received/sent over the protocol channels. Then, the USB data can be pushed through multiple layers, such as the USB virtual channel plugin layer 514, USB function layer 516, and USB driver layer 518 before reaching the operating system driver layer 520, which may for example be a Windows (available from Microsoft Corp.) operating system driver layer.

At the OS driver layer 520, the USB data can be conveyed to client 2 504 and travel through the same series of layer to reach the virtual channel manager layer 512 on client 2 504. From the virtual channel manager layer 512, the USB data can then be conveyed over the protocol layer 510 from client 2 504 to an agent operating in the second virtual desktop. USB data traveling in the opposite direction, from the second virtual desktop to the client device, can similarly follow this path through the multiple layers in the opposite direction.

Other features, such as different remote experience features, used in nested mode can likewise utilize the feature underlayer as illustrated in the example of FIG. 5 to exchange data during nested mode. As illustrated in this example, when using the feature underlayer data must traverse multiple layers to be exchanged between agent 1 502 and client 2 504 at the driver layer. Further, the data may need to be decoded and encoded when it is transferred by the feature underlayer so that it can be handled by the different layers and components. All of this can create limitations and have significant negative impacts on performance of the virtual desktop.

Figure 6:
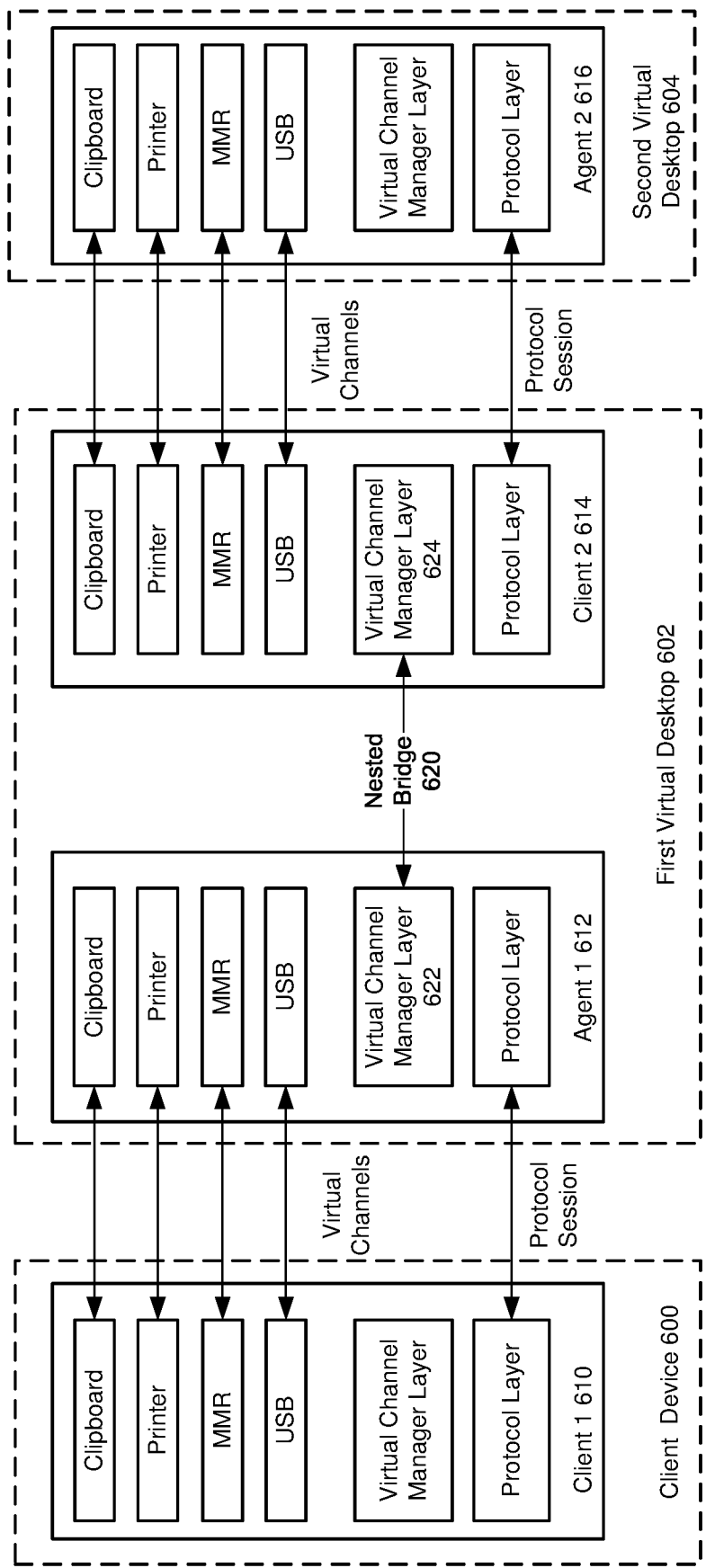
FIG. 6 illustrates an example of a nested bridge for data transfer in a virtual desktop environment under nested mode, in accordance with various embodiments.

FIG. 6 illustrates an example of a nested bridge for data transfer in a virtual desktop environment under nested mode, in accordance with various embodiments. As illustrated in the example of FIG. 6, in this nested mode configuration, client 1 610 on a client device 600 can connect to agent 1 612 on a first virtual desktop 602 in a first desktop session, and client 2 614 on the first virtual desktop 602 can connect to agent 2 616 on a second virtual desktop 604 in a second virtual desktop session. A protocol session can be established between each client 610, 614 and agent 612, 616, respectively, and various feature modules, such as remote experience features (e.g., clipboard, printer, MMR, and USB) on the clients 610, 614 can communicate with corresponding feature modules on the agents 612, 616 via corresponding virtual channels to enable the corresponding features in the virtual desktops 602, 604.

In various embodiments, to improve the performance of features requiring data exchange with the second desktop 604 in nested mode, such as the remote experience features, a nested bridge 620 can be established, which can facilitate and manage the exchange of data in the middle hop, between virtual desktop agent 1 612 and the virtual desktop client 2 614 running in the first virtual desktop 602. The nested bridge 620 can enable exchange of data between agent 1 612 and client 2 614 directly, without requiring the data to be pushed to the driver level. For example, the nested bridge 620 can route messages at the virtual channel level. This approach can also bypass feature-level encode and decode operations. As a result, feature performance can be improved significantly compared to other approaches, such as the exchange of data via the feature underlayer as discussed above.

In various embodiments, the nested bridge 620 can be used to exchange data at the virtual channel manager layer, as illustrated in the example of FIG. 6. For example, the virtual channel manager layer 622 in agent 1 612 can contain a virtual channel manager that operates to send and receive data in the session over protocol channels with client 1 610. The virtual manager can be responsible for receiving, sending, and managing the data exchanged with client 1 610 in the client device 600, which can include the sending, receiving, and managing of data such as remote experience feature data, user input data, screen data, or any other data exchanged in the remote desktop protocol. Similarly, the virtual channel manager layer 624 in client 2 624 can contain a virtual channel manager that operates to send and receive data in the protocol session, over the protocol channels with agent 2 616. This virtual channel manager can be responsible for receiving, sending, and managing the data exchanged with agent 2 616 in desktop 2 604, which can include the sending, receiving, and managing of data such as remote experience feature data, user input data, screen data, or any other data exchanged in the remote desktop protocol. In various embodiments, the nested bridge 620 can serve as a mechanism of communication between these virtual channel managers. In other embodiments, the nested bridge 620 can serve as a mechanism of communication between agent 1 612 and client 2 614 at different levels and between different components and processes. For example, benefits to efficiency may be realized by exchanging data at different levels before reaching the driver level.

In various embodiments, the nested bridge 620 can be utilized in conjunction with other channels, e.g., protocol channels or virtual channels, for exchanging data or messages between client 1 610 running on the client device 600 and agent 2 616 running in the second virtual desktop 604. The data or messages exchanged may be any kind of data or messages being transmitted between client 1 610 and agent 2 616, such as data or messages for any remote experience features, user input data, display data, or any other data. For example, the data can be conveyed from client 1 610 on the client device 600 to agent 1 612 in the first virtual desktop 602, which may be performed over a protocol connection such as a virtual channel. Then, the data can be passed from agent 1 612 to client 2 614 in the first virtual desktop 602 using the nested bridge 620. From client 2 614, the data can then be conveyed to agent 2 616 in the second virtual desktop 604, which may also be performed over a protocol connection such as a virtual channel. Data can likewise be communicated from the virtual desktop agent 2 616 to client 1 610 in the reverse direction, in reverse order. For example, data can be conveyed over a virtual channel from agent 2 616 to client 2 614, over the nested bridge 620 from client 2 614 to agent 1 612, and over a virtual channel from agent 1 612 to client 1 610. As a result, a fast and efficient path for exchanging data between client 1 610 on the client device 600 and the second virtual desktop 604 is provided, which can be utilized for enabling and improving various features and capabilities in the second virtual desktop.

In various embodiments, the nested bridge 620 can utilize an Inter-Process Communication (IPC) mechanism for communicating data between agent 1 612 and client 2 614, or between processes or threads running in agent 1 612 and client 2 614. In some embodiments, with IPC, a process running in client 2 614 can communicate with a process running in agent 1 612 using a buffer, which can be a common space or memory location for the processes. The processes can communicate by reading data from and writing data to the shared memory area. When one process needs to communicate data to the other, the sending process can write the data in the buffer and the receiving process can read the data from the buffer. In other embodiments, IPC can operate by message-passing, without necessarily using shared memory space. In this case, the sending process can pass a message, which can be accompanied by various address information of the receiving process such as a passing name or a mailbox name, and the messages can be conveyed to or retrieved by the receiving process.

Figure 7:
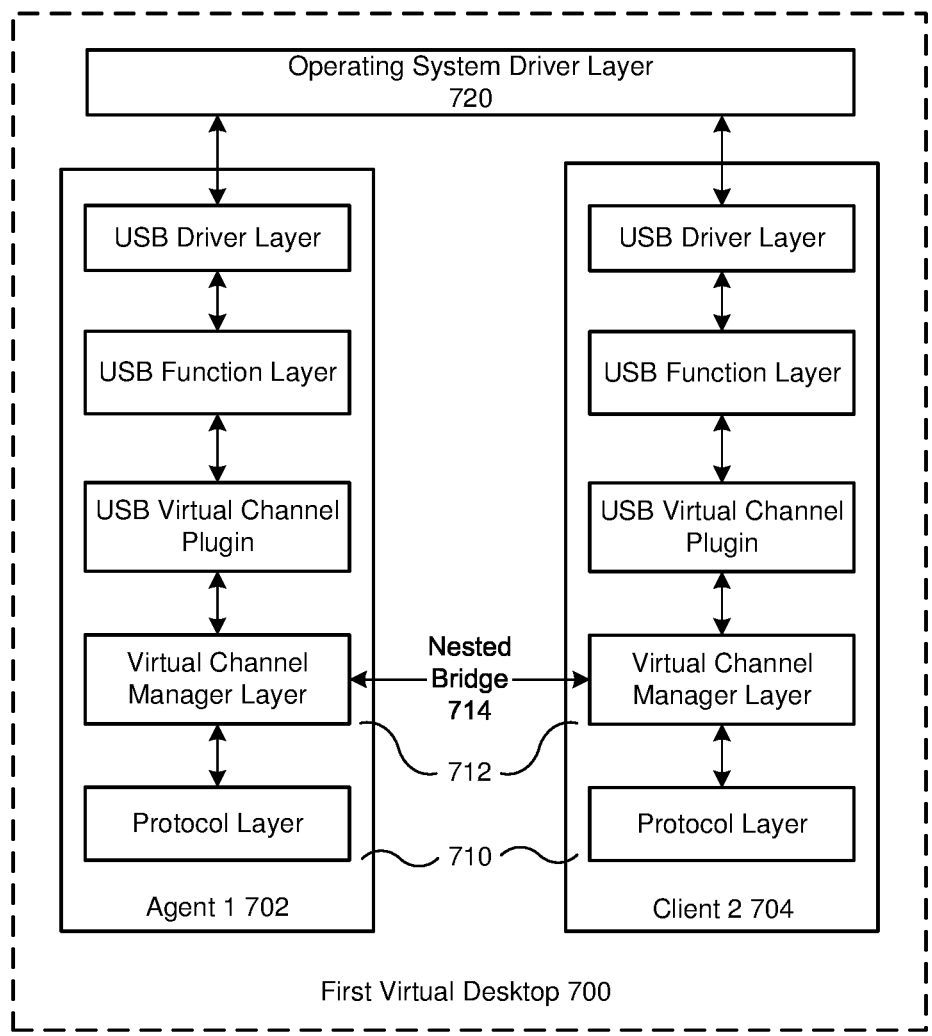
FIG. 7 illustrates an example of data exchange via a nested bridge in USB redirection under nested mode, in accordance with various embodiments.

FIG. 7 illustrates an example of data exchange via a nested bridge in USB redirection under nested mode, in accordance with various embodiments. As illustrated in the example of FIG. 7, agent 1 702 and client 2 704 can operate in a first virtual desktop 700. The first desktop 700 can be a first virtual desktop in a nested mode configuration, where another client running on a client device is connected with agent 1 702 to establish a session on the first desktop 700, and client 2 704 is connected to another agent running in a second virtual desktop to establish a second virtual desktop session on the second desktop.

To perform USB redirection using the illustrated nested bridge 714 when a user is using the nested mode, USB data can first be received at the protocol layer 710 of agent 1 702. For example, the data can be conveyed from a client running on the user client device via a virtual channel. In agent 1 702, the data can be received by a virtual channel manager in a virtual channel manager layer 712 from the protocol layer 710, which can be responsible for receiving, sending, and managing data received/sent over the protocol channels. Then, at the virtual channel manager layer 712, the data can be passed to client 2 704 (e.g., to a virtual channel manager in client 2 704). From the virtual channel manager layer 712 on client 2 704, the USB data can then be conveyed over the protocol layer 510 from client 2 504 to an agent operating in the second virtual desktop. USB data traveling in the opposite direction, from the second virtual desktop to the client device, can similarly follow this path in the opposite direction.

Other features, such as different remote experience features, used in nested mode can likewise utilize the nested bridge 714 as illustrated in the example of FIG. 7 to exchange data during nested mode.

As can be seen in the example of FIG. 7, the nested bridge 714 provides a significantly more efficient way of data exchange than the feature underlayer discussed in the example of FIG. 5, which required the transfer of data back and forth through multiple layers to transfer data at the driver layer 720. This approach can also avoid the need to decode and encode data when it is transferred by the feature underlayer so that it can be handled by the different layers and components. As a result, the nested bridge 714 can eliminate limitations and significantly improve performance of features in nested mode.

Figure 8:
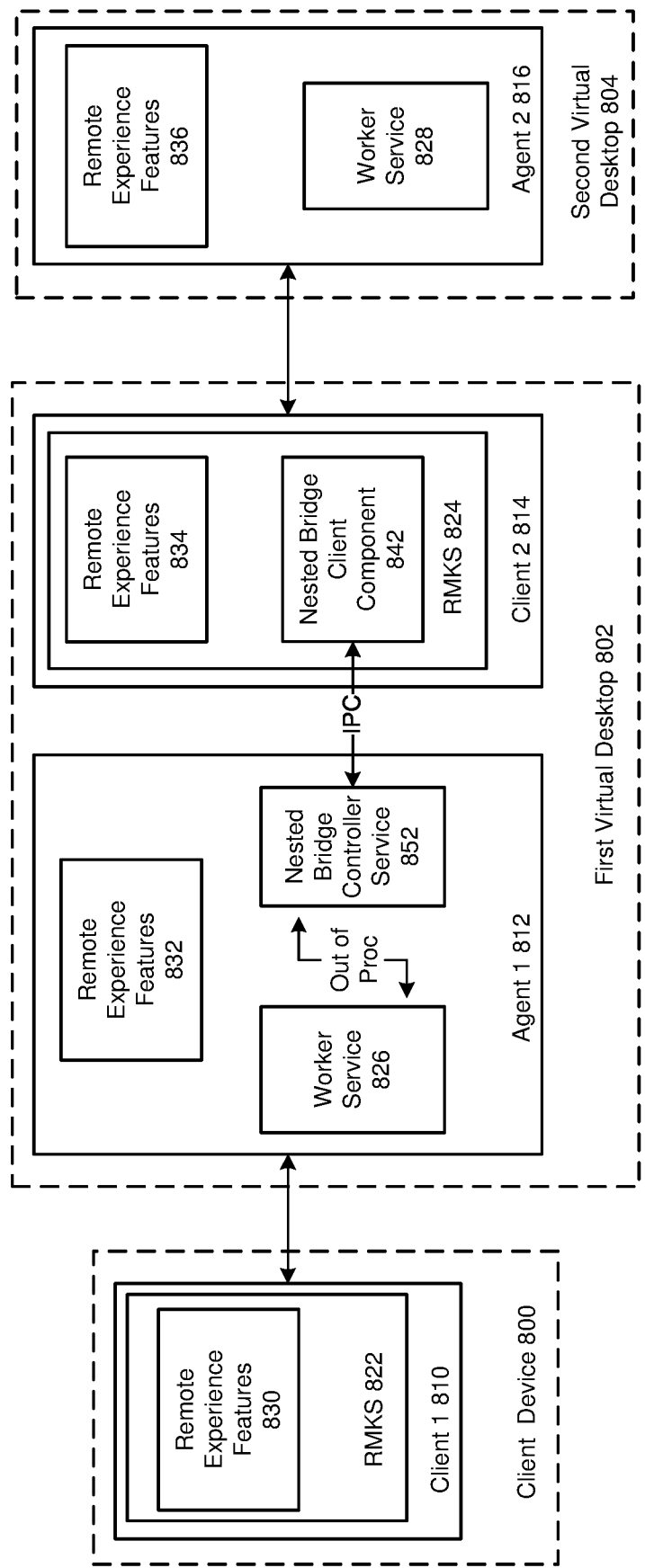
FIG. 8 illustrates an example architecture of a nested bridge for data transfer in a virtual desktop environment under nested mode, in accordance with various embodiments.

FIG. 8 illustrates an example architecture of a nested bridge for data transfer in a virtual desktop environment under nested mode, in accordance with various embodiments. As illustrated in the example of FIG. 8, in this nested mode configuration, client 1 810 on a client device 800 can connect to agent 1 812 on a first virtual desktop 802 to establish a first desktop session, and client 2 814 on the first virtual desktop 802 can connect to agent 2 816 on a second virtual desktop 804 to establish a second virtual desktop session. A protocol session can be established between each corresponding client 810, 814 and agent 812, 816 and various feature modules, such as remote experience features 830, 834 (e.g., clipboard, printer, MMR, RTAV, USB, etc.) on each client 810, 814 can communicate with corresponding feature modules 832, 836 on the agents 812, 816 via virtual channels to enable the corresponding features in the virtual desktops 802, 804.

A remote mouse-keyboard-screen (RMKS) module 822 can run in client 1 810, which can be responsible for managing the exchange of various information with agent 1 812 during the session on the virtual desktop 802, such as information for enabling user interaction with the desktop 802. For example, the RMKS module 822 can send user inputs (mouse and keyboard inputs) to agent 1 812 and receive screen (GUI) information such as pixel data from agent 1 812. Various remote experience feature modules 830 (e.g., MMR, printer, RTAV, clipboard, USB, etc.) can be contained in the RMKS module 822 and the RMKS process can likewise manage the sending and receiving of data for enabling these features in the desktop 802. An RMKS module 824 can also be located in client 2 814 and similarly manage the exchange of information with agent 2 816 in the second virtual desktop 804, including the exchange of information for various remote experience features 834, 836 in the second desktop 804.

In various embodiments, a worker service 826 on the agent 1 812 can be responsible for managing interactions with the desktop 802 on the agent-side. For example, in an implementation using the VMware Blast protocol, the worker service 826 may be a Blast Worker process. The worker service 826 can be responsible for capturing GUI data (e.g., pixel data) on the desktop 802 and sending it to the client 1 810. The worker 826 can also receive user inputs (e.g., from client 1 810) and convey them to the operating system of the desktop 802 to be effectuated. Data and messages corresponding to remote experience features 832 sent by client 1 810 can also be received by the worker service 826 over a virtual channel. Similarly, a worker service 828 can be running on the second desktop 804 for performing analogous functions on the second desktop 804, that is, the worker service 828 can be responsible for capturing GUI data (e.g., pixel data) on the second desktop 804 and sending it to client 2 814. The worker 828 can also receive inputs (e.g., from client 2 814) and convey them to the operating system of the desktop 804 to be effectuated. Data and messages corresponding to remote experience features 836 sent by client 2 814 can also be received by the worker service 828 over a corresponding virtual channel.

In various embodiments, agent 1 812 can further contain a nested bridge controller service 852, which can act as the controller of the nested bridge. The nested bridge controller service 852 can communicate with the worker service 826 by sending and receiving out of proc (out of process) messages, as illustrated. Via the worker service 826, the nested bridge controller service 852 can further communicate with client 1 810. For example, data and messages can be sent from client 1 810 to the worker service 826 over a virtual channel and then to the nested bridge controller service 852 via an out of proc message. Similarly, the nested bridge controller service 852 can send data and messages to client 1 810 by sending the data or message to the worker service 826 via an out of proc message and having the worker service 826 forward the data or message to client 1 810 over the virtual channel.

The nested bridge controller service 852 can interact and communicate with a nested bridge client component 842 in client 2 814 through IPC. In various embodiments, the nested bridge client component 842 can be a dll (a dynamic link library file or component) that runs in the RMKS module 824. The nested bridge client component 842 can take over (e.g., intercept) virtual channel connections between client 2 814 and agent 2 816 and then transfer data that is sent over the virtual channel to the nested bridge controller 852 by IPC. Similarly, the nested bridge client component 842 can receive data by IPC from the nested bridge controller 852 and send the data over the virtual channel to agent 2 816.

Thus, the nested bridge controller service 852 and the nested bridge client component 842 can connect virtual channels between client 1 810 and agent 1 812 with virtual channels between client 2 814 and agent 2 816 so that data, such as remote experience feature data, can be transmitted from client 1 810 to agent 2 816. For example, to send data, such as remote experience feature data (e.g., USB redirection) from client 1 810 to agent 2 816, the data can be first conveyed over a virtual channel from client 1 810 to the worker service 826 in agent 1 812. By the worker service 826, the data can be conveyed (e.g., via an out of proc message) to the nested bridge controller service 852. The controller service 852 can convey the data via IPC to the nested bridge client component 842 in client 2 814, which can subsequently convey the data over a virtual channel to agent 2 816. To send data (e.g., remote experience feature data) in the opposite direction, from agent 2 816 to client 1 810, the nested bridge client component 842 can receive or intercept the data that is sent over the virtual channel from agent 2 816 to client 2 814 and convey the data to the nested bridge controller 852 by IPC. The controller service 852 can then convey the data via an out of proc message (as illustrated) to the worker service 826, which can subsequently convey the data to client 1 810 over the virtual channel. In this way, data for enabling other types of features can likewise be efficiently exchanged between client 1 810 and agent 2 816.

Figure 9:
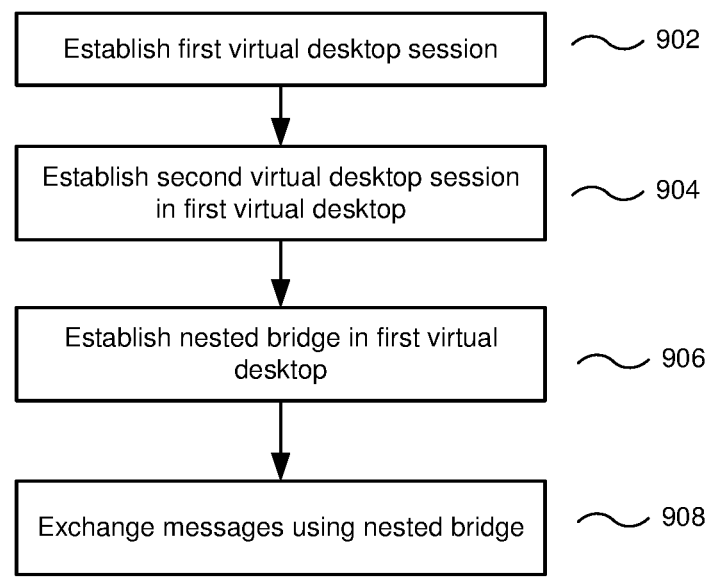
FIG. 9 illustrates an example process flow for data transfer using a nested bridge in a virtual desktop environment under nested mode, in accordance with various embodiments.

FIG. 9 illustrates an example process flow for data transfer using a nested bridge in a virtual desktop environment under nested mode, in accordance with various embodiments. The process can begin in operation 902, where a first virtual desktop session can be established. For example, the session can be established by a user logging into the first virtual desktop via a first client running on the user's client device. The first client can connect to a first agent in the first desktop to establish the session and one or more virtual channels can be formed for communicating data between the first client and the first agent. In operation 904, a second virtual desktop session can be established in the first virtual desktop. For example, the second session can be established by the user opening a second client inside the first virtual desktop and logging into the second virtual desktop with the second client. The second client can connect to a second agent in the second desktop to establish the second session and one or more virtual channels can be formed for communicating data between the second client and the second agent.

It should be noted that, in various embodiments, after both virtual desktop sessions are established in a nested configuration, a user may be able to disconnect and reconnect the first virtual desktop session without terminating the second virtual desktop session. For example, after the first and second virtual desktop sessions are established, the first virtual desktop session can be disconnected while keeping the second virtual desktop session. Subsequently, the first virtual desktop session can be established again (e.g., the client and agent can be reconnected).

In operation 906, a nested bridge can be established in the first virtual desktop. As described above, the nested bridge can connect the agent of the first desktop with the client of the second desktop to provide an efficient mechanism of communication between the first agent and the second client operating in the first desktop. The nested bridge can utilize IPC to allow a process in the first agent to communicate with a process in the first client. Consequently, in operation 908, messages can be exchanged between the first agent and the second client in the first desktop over the nested bridge.

For example, data to be communicated from the first client on the client device to the second agent in the second desktop can be conveyed using the nested bridge. In this case, for example, data or messages can be sent over a virtual channel from the first client to the first agent in the first desktop, and then over the nested bridge from the first agent in the first desktop to the second client, also in the first desktop. Finally, the data or message can be sent from the second client in the first desktop to the second agent in the second desktop over a corresponding virtual channel. Data and messages can likewise be communicated in the opposite direction, from the second agent to the first client, over this path in reverse order.

In various embodiments, messages can be exchanged between the first client and the second agent for utilizing one or more remote experience features in the second virtual desktop, such as USB redirection, clipboard redirection, printer redirection, MMR, etc. For example, printer data, USB data, multimedia data and so on can be exchanged between the first client and the second agent using the nested bridge in conjunction with virtual channels between the clients and agents as described above.

Figure 10:
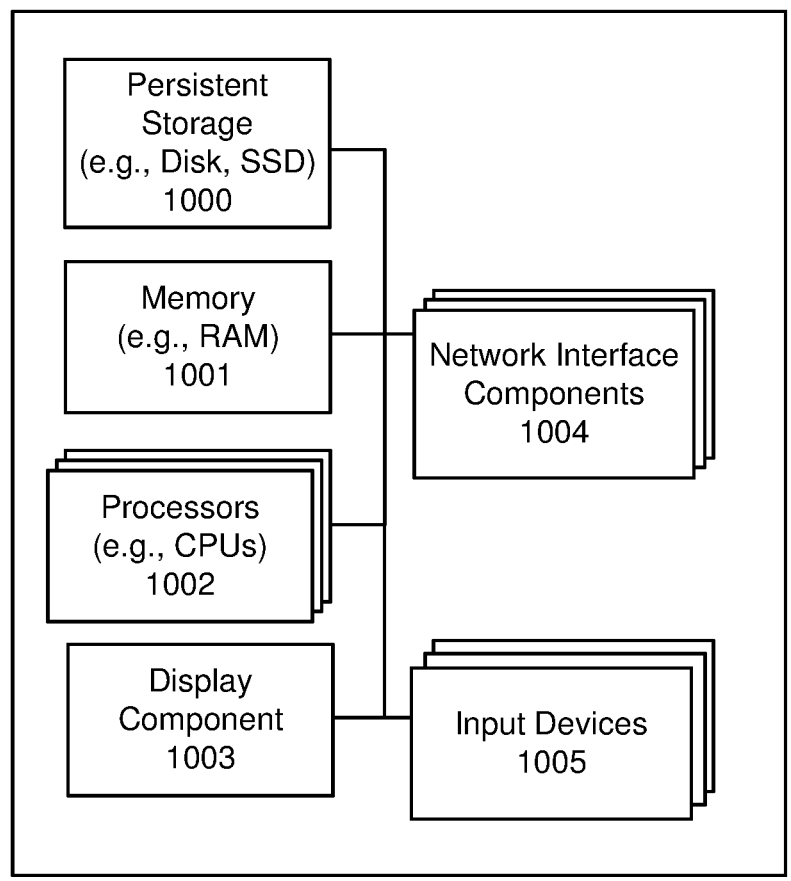
FIG. 10 illustrates an example of some general components of a computing device, in accordance with various embodiments.

FIG. 10 illustrates an example of some general components of a computing device, in accordance with various embodiments. In this particular example, the device includes one or more processors (e.g., central processing units (CPUs) 1002 for executing instructions that can be stored in a storage medium component. The storage medium can include many types of memory, persistent data storage, or non-transitory computer-readable storage media. For example, the storage medium may take the form of random access memory (RAM) 1001 storing program instructions for execution by the processor(s) 1002, a persistent storage (e.g., disk or SSD) 1000, a removable memory for sharing information with other devices and/or the like. The computing device typically can further comprise a display component 1003, such as a monitor, a touch screen, liquid crystal display (LCD), or the like. In various embodiments, the computing device will include at least one input device 1005 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 1004 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for exchanging data in virtual desktop environments under nested mode using a nested bridge, comprising:
    establishing, over a network connection, a first virtual desktop session between a first virtual desktop client operating on a client computing device and a first virtual desktop agent operating in a first virtual desktop on a host server;
    establishing a second virtual desktop session between a second virtual desktop client operating in the first virtual desktop and a second virtual desktop agent operating in a second virtual desktop;
    establishing a nested bridge in the first virtual desktop between the first virtual desktop agent and the second virtual desktop client for communicating data between the first virtual desktop agent and the second virtual desktop client using Inter-Process Communication (IPC); and
    exchanging messages between the first virtual desktop agent and the second virtual desktop client in the first virtual desktop using the nested bridge.

2. The method of claim 1, further comprising conveying messages from the first virtual desktop client on the client device to the second virtual desktop agent on the second virtual desktop by conveying the messages from the first virtual desktop client to the first virtual desktop agent over a first virtual channel, then from the first virtual desktop agent to the second virtual desktop client using the nested bridge, and then from the second virtual desktop client to the second virtual desktop agent over a second virtual channel.

3. The method of claim 1, further comprising conveying messages from the second virtual desktop agent on the second virtual desktop to the first virtual desktop client on the client device by conveying the messages from the second virtual desktop agent to the second virtual desktop client over a first virtual channel, then from the second virtual desktop client to the first virtual desktop agent using the nested bridge, and then from the first virtual desktop agent to the first virtual desktop client over a second virtual channel.

4. The method of claim 1, wherein the messages are exchanged by a process running in the first virtual desktop agent that communicates with a process running in the second virtual desktop client via the nested bridge using IPC.

5. The method of claim 1, wherein the messages are exchanged using the nested bridge between the first virtual desktop agent and the second virtual desktop client without passing the messages at the driver level.

6. The method of claim 1, wherein:
    a first virtual channel manager in the first virtual desktop agent exchanges the messages over a first virtual channel with the first virtual desktop client;
    a second virtual channel manager in the second virtual desktop client exchanges the messages over a second virtual channel with the second virtual desktop agent; and
    the first virtual channel manager and the second virtual channel manager exchange the messages via the nested bridge using IPC.

7. The method of claim 1, wherein the messages are exchanged between the first virtual desktop client and the second virtual desktop agent for utilizing one or more remote experience features in the second virtual desktop, the one or more remote experience features comprising at least one of: USB redirection, clipboard redirection, audio redirection, video redirection, or printer redirection.

8. A computing device for exchanging data in virtual desktop environments under nested mode using a nested bridge, comprising:
    at least one processor; and
    memory including instructions that, when executed by the at least one processor, cause the computing device to perform the steps of:
    establishing, over a network connection, a first virtual desktop session between a first virtual desktop client operating on a client computing device and a first virtual desktop agent operating in a first virtual desktop on a host server;
    establishing a second virtual desktop session between a second virtual desktop client operating in the first virtual desktop and a second virtual desktop agent operating in a second virtual desktop;
    establishing a nested bridge in the first virtual desktop between the first virtual desktop agent and the second virtual desktop client for communicating data between the first virtual desktop agent and the second virtual desktop client using Inter-Process Communication (IPC); and
    exchanging messages between the first virtual desktop agent and the second virtual desktop client in the first virtual desktop using the nested bridge.

9. The computing device of claim 8, wherein the memory further includes instructions that when executed by the at least one processor, cause the computing device to perform the steps of:
    conveying messages from the first virtual desktop client on the client device to the second virtual desktop agent on the second virtual desktop by conveying the messages from the first virtual desktop client to the first virtual desktop agent over a first virtual channel, then from the first virtual desktop agent to the second virtual desktop client using the nested bridge, and then from the second virtual desktop client to the second virtual desktop agent over a second virtual channel.

10. The computing device of claim 8, wherein the memory further includes instructions that when executed by the at least one processor, cause the computing device to perform the steps of:
conveying messages from the second virtual desktop agent on the second virtual desktop to the first virtual desktop client on the client device by conveying the messages from the second virtual desktop agent to the second virtual desktop client over a first virtual channel, then from the second virtual desktop client to the first virtual desktop agent using the nested bridge, and then from the first virtual desktop agent to the first virtual desktop client over a second virtual channel.

11. The computing device of claim 8, wherein the messages are exchanged by a process running in the first virtual desktop agent that communicates with a process running in the second virtual desktop client via the nested bridge using IPC.

12. The computing device of claim 8, wherein the messages are exchanged using the nested bridge between the first virtual desktop agent and the second virtual desktop client without passing the messages at the driver level.

13. The computing device of claim 8, wherein:
a first virtual channel manager in the first virtual desktop agent exchanges the messages over a first virtual channel with the first virtual desktop client;
a second virtual channel manager in the second virtual desktop client exchanges the messages over a second virtual channel with the second virtual desktop agent; and
the first virtual channel manager and the second virtual channel manager exchange the messages via the nested bridge using IPC.

14. The computing device of claim 8, wherein the messages are exchanged between the first virtual desktop client and the second virtual desktop agent for utilizing one or more remote experience features in the second virtual desktop, the one or more remote experience features comprising at least one of: USB redirection, clipboard redirection, audio redirection, video redirection, or printer redirection.

15. A non-transitory computer readable storage medium comprising one or more sequences of instructions, the instructions when executed by one or more processors causing the one or more processors to execute the operations of:
establishing, over a network connection, a first virtual desktop session between a first virtual desktop client operating on a client computing device and a first virtual desktop agent operating in a first virtual desktop on a host server;
establishing a second virtual desktop session between a second virtual desktop client operating in the first virtual desktop and a second virtual desktop agent operating in a second virtual desktop;
establishing a nested bridge in the first virtual desktop between the first virtual desktop agent and the second virtual desktop client for communicating data between the first virtual desktop agent and the second virtual desktop client using Inter-Process Communication (IPC); and
exchanging messages between the first virtual desktop agent and the second virtual desktop client in the first virtual desktop using the nested bridge.

16. The non-transitory computer readable storage medium of claim 15, further comprising instructions that when executed by the one or more processors cause the one or more processors to execute the operations of:
conveying messages from the first virtual desktop client on the client device to the second virtual desktop agent on the second virtual desktop by conveying the messages from the first virtual desktop client to the first virtual desktop agent over a first virtual channel, then from the first virtual desktop agent to the second virtual desktop client using the nested bridge, and then from the second virtual desktop client to the second virtual desktop agent over a second virtual channel.

17. The non-transitory computer readable storage medium of claim 15, further comprising instructions that when executed by the one or more processors cause the one or more processors to execute the operations of:
conveying messages from the second virtual desktop agent on the second virtual desktop to the first virtual desktop client on the client device by conveying the messages from the second virtual desktop agent to the second virtual desktop client over a first virtual channel, then from the second virtual desktop client to the first virtual desktop agent using the nested bridge, and then from the first virtual desktop agent to the first virtual desktop client over a second virtual channel.

18. The non-transitory computer readable storage medium of claim 15, wherein the messages are exchanged by a process running in the first virtual desktop agent that communicates with a process running in the second virtual desktop client via the nested bridge using IPC.

19. The non-transitory computer readable storage medium of claim 15, wherein the messages are exchanged using the nested bridge between the first virtual desktop agent and the second virtual desktop client without passing the messages at the driver level.

20. The non-transitory computer readable storage medium of claim 15, wherein:
a first virtual channel manager in the first virtual desktop agent exchanges the messages over a first virtual channel with the first virtual desktop client;
a second virtual channel manager in the second virtual desktop client exchanges the messages over a second virtual channel with the second virtual desktop agent; and
the first virtual channel manager and the second virtual channel manager exchange the messages via the nested bridge using IPC.

* * * * *